United States Patent [19]

Adaniya et al.

[11] Patent Number: 4,970,126

[45] **Date of Patent: * Nov. 13, 1990**

[54] HIGHLY CORROSION-RESISTANT, MULTI-LAYER COATED STEEL SHEETS

[75] Inventors: Takeshi Adaniya; Masaaki Yamashita; Takahiro Kubota, all of Tokyo; Norio Nikaido, Hiratsuka; Yoshiaki Miyosawa, Hiratsuka; Tadashi Nishimoto, Hiratsuka; Kazuhiko Ozawa, Hiratsuka, all of Japan

[73] Assignees: Nippon Kokan Kabushiki Kaisha, Tokyo; Kansai Paint Co., Ltd., Amagasaki, both of Japan

[ * ] Notice: The portion of the term of this patent subsequent to Oct. 4, 2005 has been disclaimed.

[21] Appl. No.: 162,603

[22] Filed: Mar. 1, 1988

[30] Foreign Application Priority Data

Mar. 13, 1987 [JP] Japan .................................. 62-59726

[51] Int. Cl.[5] .............................................. B32B 15/04

[52] U.S. Cl. ....................................... 428/623; 428/626; 428/632; 428/633; 428/659

[58] Field of Search ............... 428/623, 626, 632, 633, 428/659, 684

[56] References Cited

U.S. PATENT DOCUMENTS

| | | | |
|---|---|---|---|
| 4,411,964 | 10/1983 | Hara et al. | 428/626 |
| 4,659,394 | 4/1987 | Hara et al. | 428/623 |
| 4,775,600 | 9/1988 | Adaniya et al. | 428/623 |

*Primary Examiner*—Theodore Morris
*Assistant Examiner*—George Wyszomierski
*Attorney, Agent, or Firm*—Henry C. Nields

[57] ABSTRACT

This invention relates to a highly corrosion-resistant, multi-layer coated steel sheet, and includes an undercoat film obtained by galvanization or zinc-alloy plating and a chromate coated film thereon, on which a resin-composition film is further applied, comprising an organic high-molecular weight resin having a glass transision temperature of 343° to 423° K. and soluble in organic solvent and hydrophobic silica.

For the purpose of improvement of corrosion preventiveness, a sparingly water soluble Cr compound may be contained in this resin composition film. Together with this sparingly water soluble Cr compound, a di- or tri-alkoxysilane compound may be also contained in the resin composition film.

16 Claims, 4 Drawing Sheets

Testing

① $H_2O$ permeability - Pain cup method

② $O_2$ permeability - Seika-ken method

③ Impact test - JIS - k - 5400 - 79 Paint B method of ordinary test methods

HIGHLY CORROSION-RESISTANT, MULTI-LAYER COATED STEEL SHEETS

SUMMARY OF THE DISCLOSURE

This invention relates to a highly corrosion-resistant, multi-layer coated steel sheet, and includes an undercoat film obtained by galvanization or zinc-alloy plating and a chromate coated film thereon, on which a resin-composition film is further applied, comprising an organic high-molecular weight resin having a glass transition temperature of 343° to 423° K. and soluble in organic solvents and hydrophobic silica.

For the purpose of improving corrosion preventiveness, a sparingly water soluble Cr compound may be contained in this resin-composition film. Together with this sparingly water soluble Cr compound, a di- or tri-alkoxysilane compound may also be contained in the resin-composition film.

BACKGROUND OF THE INVENTION

In recent years, the bodies of automobiles have been required to excel in corrosion resistance. For that reason, there has been an increasing tendency to use surface-treated steel sheets showing high corrosion resistance in place of the cold-rolled steel sheets used heretofore.

As such surface-treated steel sheets, galvanized steel sheets deserve the first mention. In the galvanized steel sheets, it is required to increase the amount of zinc to be deposited so as to improve their corrosion resistance. This offers the problems that workability and weldability deteriorate. Steel sheets plated with a zinc alloy to which one or two or more of elements such as Ni, Fe, Mn, Mo, Co, Al and Cr is or are added, or multilayered plated steel sheets have been studied and developed in order to solve such problems. In comparison with said galvanized steel sheets, these steel sheets may be improved in respect of corrosion resistance without causing deterioration of weldability and workability. However, when steel sheets are applied to the bag-structure portions or bends (hemmed portions) of the inner plates of automotive bodies, their surfaces are required to possess high corrosion resistance. A problem with such zinc alloy- or multilayered-plated steel sheets as mentioned above is that their corrosion resistance is still unsatisfactory. As the steel sheets possessing high corrosion resistance, rustproof coated steel sheets applied thereon with a zinc-enriched film have been investigated and developed, as disclosed in Japanese Patent Publication Nos. 45-24230 and 47-6882, and have typically been known under the name of Zincrometal. Even with such rustproof coated steel sheets, however, the coated films may peel off at locations subjected to press-forming, etc., resulting in deterioration of their corrosion resistance. Thus, they are still unsatisfactory for the highly corrosion-resistant, rustproof coated steel sheets needed to meet the requirements of the materials for automotive bodies, etc.

In view of the foregoing considerations and some limitations imposed on the improvements in the performance of the rustproof coated steel sheets by the zinc-enriched films, the present inventors have separately developed steel sheets including thereon protective films in the form of thin films on the order of at most several micrometers and free from any metal powders such as Zn powders, and have proposed them in Japanese Patent Laid-Open Publication Nos. 58-224174, 60-50179, 60-50180 and 60-50181. Such steel sheets are based on zinc or zinc alloy-plated steel sheets, on which a chromate film and the outermost organic composite silicate film are applied, and are found to possess excellent workability and corrosion resistance.

However, later studies made by the present inventors have revealed that as compared to the zinc-enriched film base steel sheet widely used as the rustproof steel sheets for automobiles (for instance, Japanese Patent Publication No. 45-24230), such treated steel sheets as mentioned above are slightly inferior in corrosion resistance in wet environments.

On the other hand, the steel sheets for automobiles have shown a thinning tendency, since it has been intended to reduce the weight of their bodies. As the steel sheets suitable for this, wide use has been made of the so-called bake-hardened steel sheets (the BH type steel sheets) possessing spreadability at an environmental temperature of 120° C. or lower and toughness at 120° C. or higher. For that reason, the film-forming material suitable for such steel sheets should give a complete film at a low temperature of no higher than 150° C., and is required to possess film durability enough to maintain the corrosion resistance of metals. However, the aforesaid coated steel sheets proposed by the present inventors could not be said to possess satisfactory properties in this regard.

With such problems in mind, the present invention has been accomplished for the purpose of providing a highly corrosionresistant, multi-layer coated steel sheet which posseses workability and weldability, has excellent corrosion resistance of uncoated steel sheet, and shows coating adhesion with respect to multi-coating, corrosion resistance coated steel sheet and low-temperature hardenability.

OUTLINE OF THE INVENTION

The present invention provides a highly corrosion-resistant, multi-layer coated steel sheet, inter alia, a multi-layer coated steel sheet suitable for automotive bodies, etc.

In the present invention, the following means were used so as to solve such problems as mentioned above.

(1) In order to achieve corrosion resistance in wet environments, a resin film forming the outermost layer of the multi-layer coated steel sheet should have the film structure to prevent the permeation of oxygen and moisture that are regarded as the factor of metal corrosion. It is well known that the coated film shows strikingly increased oxygen and moisture permeability on the low-temperature side of its glass transition temperature (Tg), and that the coated film in a water-absorbed wet state shows a glass transition temperature much lower than that in a dry state. In order to attain a corrosion-inhibiting action, therefore, the film is required to have a glass transition temperature higher than the environmental temperature at which steel sheets are used. For that reason, an organic high-molecular weight resin having a given range of glass transition temperatures was used as the substrate resin. It is further required that the organic resin contain in its composition a reduced amount of functional groups of hydrophilic nature. For that reason, use was made of a hydrophobic resin soluble in organic solvents, rather than a water-soluble resin.

The silica component is apt to easily absorb moisture, since the surfaces of silica particles are formed by hydrophilic silanol groups. For that reason, the so-called hydrophobic silica, in which the silanol groups are alkylated, was used to inhibit the absorption of moisture into the film.

(2) In order to sustain corrosion resistance, the passivation of metals by a sexivalent chromium compound was used at the same time. As the chromium compound, a compound sparingly water soluble in water was selected to inhibit excessive water absorption and allow elution of sexivalent chromium, thereby sustaining the corrosion-inhibiting action.

(3) In order to obtain the low-temperature hardening type film needed for application to the bake-hardened steel materials, use was made of a di- or tri-alkoxysilane compound (the so-called silane coupling agent) which took part in the crosslinking between the organic and inorganic compounds, thereby promoting the bonding between the organic resin-silica-chromium compound.

The multi-layer coated steel sheet of the present invention includes a steel sheet plated with zinc or a zinc alloy, which has the following films A and B formed on its plated side in that order.

A: a chromate film, and

B: a resin-composition film composed of an organic high-molecular weight resin having a glass transition temperature of 343° to 423° K. and soluble in an organic solvent and hydrophobic silica in a proportion of 99:1 to 30:70 in weight (organic high-molecular weight resin: hydrophobic silica) ratio, and said films being deposited in a coating amount of 0.3 to 3.0 g/m$^2$.

For the purpose of further improvements in corrosion resistance, the aforesaid resin-composition film may contain a sparingly water soluble Cr compound in a proportion of 1 to 30 weight parts per 100 weight parts of the organic high-molecular weight resin.

For the purpose of promoting the crosslinking reaction involved, the resin-composition film may further contain with this sparingly water soluble Cr compound a di- or tri-alkoxysilane compound in a proportion of 0.5 to 15 weight parts per 100 weight parts of the (organic high-molecular resin + hydrophobic silica + slightly soluble Cr compound).

DETAILED EXPLANATION OF THE INVENTION

Figure 1:
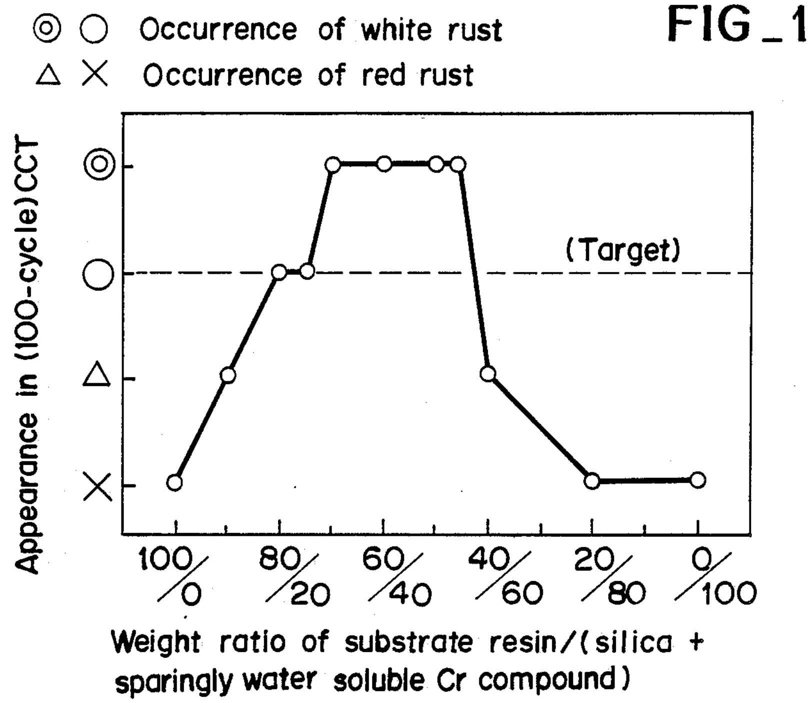
FIGS. 1 to 3 show the relationship between the substrate resin/(silica + sparingly water soluble Cr compound) and the corrosion resistance.

The present invention uses as the starting material a steel sheet plated with zinc or a zinc alloy, and includes on its surface a chromate film, which further includes thereon a resin film containing the given additives.

The zinc or zinc alloy-plated steel sheets to be used as the starting material may include steel sheets which are galvanized or plated with zinc-iron alloys, zinc-nickel alloys, zinc-manganese alloys, zinc-aluminium alloys and zinc-cobalt-chromium alloys. These plating components may contain one or more of elements such as Ni,Fe,Mn,Mo,Co, Al and Cr. Use may also be made of compositely plated steel sheets having two or more deposits of the indentical or different types. For instance, a film consisting of two or more layers of Fe-Zn alloys having different Fe contents may be deposited onto a steel sheet.

Of these, preference is given to the steel sheets plated with zinc-nickel and zinc-manganese alloys in view of corrosion resistance in particular. When these steel sheets are used, it is preferred that the nickel content of the deposited film ranges from 5 to 20 weight % for the steel sheets plated with zinc-nickel alloys, and the manganese content of the deposited film ranges from 30 to 85 weight % for the steel sheets with zinc-manganese alloys.

The steel sheets may be plated with zinc or zinc alloys by any one of the electrolytic, hot dip, gas-phase and like processes, provided that they are feasible. However, electroplating without heating is advantageous, since rust-proof sheets, to which the present invention is applied, are primary designed to find use in automotive body applications wherein it is of importance not to cause damage to the quality of the cold-rolled steel sheets to be plated.

A chromate film is formed on the surface of the starting plated steel sheet by treating it with chromic acid.

In the chromate film, the amount—on the dry basis—of chromium deposited is suitably in the order of 1 to 1,000 mg/m$^2$, preferably 10 to 200 mg/m$^2$, more preferably 30 to 80 mg/m$^2$, calculated as metallic chromium. When the amount of chromium deposited exceeds 200 mg/m$^2$, workability and weldability tend to deteriorate, and this tendency becomes noticeable in an amount exceeding 1,000 mg/m$^2$. When the amount of chromium deposited is below 10 mg/m$^2$, on the other hand, it is likely that the obtained film may become uneven, resulting in deterioration of its corrosion resistance. Such deterioration of corrosion resistance is particularly noticeable in an amount of less than 1 mg/m$^2$. It is preferable that sexivalent Cr is present in the chromate film. The sexivalent Cr produces a repairing action, and serves to inhibit the occurrence of corrosion from flaws in the steel sheet, flaws arise.

The chromate treatment for obtaining such an undercoat may be carried out by any one of the known reaction, coating and elecrolytic type processes.

The coating type chromate treatment liquid is composed mainly of a solution of partly reduced chromic acid and, if required, may contain an organic resin such as a water-dispersible or -soluble acrylic resin and/or silica (colloidal silica, fused silica) having a particle size of several mμ to several hundreds mμ. It is then preferable that the $Cr^{3+}$ to $Cr^{6+}$ ratio is 1/1 to 1/3, and pH is 1.5 to 4.0, preferably 2 to 3. The $Cr^{3+}$ to $Cr^{6+}$ ratio is adjusted to the predetermined value by using general organic reducing agents (e.g., saccharides, alcohols, etc.) or inorganic reducing agents. The coating type chromate treatment may rely upon any one of the roll coating, immersion and spray processes. In the coating chromate treatment, the films are obtained by the chromate treatment, followed by drying without water washing. The reason for carrying out drying without water washing is that usually applied water washing causes removal of $Cr^{6+}$. By conducting drying without water washing in this manner, it is possible to keep the $Cr^{3+}$ to $Cr^{6+}$ ratio constant in a stable state, and inhibit excessive elution of $Cr^{6+}$ in corrosive environments by the organic high-molecular resin layer formed on the chromate film, hence, effectively maintain the passivating action of $Cr^{6+}$ over an extended period of time, thereby achieving high corrosion-resistant ability.

In the electrolytic type chromate treatment, on the other hand, cathodic electrolysis is carried out in a bath containing chromic anhydride and one or two or more of anions of sulfuric acid, fluoride phosphates, halogen oxyacids and so on, and water washing and drying are then conducted to obtain the films. From the comparison of the chromate films obtained by the aforesaid two treatment processes, it is found that the coating type chromate film is superior in corrosion resistance to the electrolytic type chromate film due to its increased content of $Cr^{6+}$. In addition, when heat-treated as will be described later, the former is improved in corrosion resistance over the latter due to its further densification and intensification. However, the electrolytic type chromate film is advantageous, partly because its integrity is increased regardless of whether or not the heat treatment is applied, and partly because it is easy to control the amount of the film deposited. With corrosion resistance in mind, the most preference is given to the coating type chromate film. In view of the fact that the rust-proof steel sheets for automobiles are often treated on one side only, however, the coating and electrolytic type chromate films may be desired for use.

The chromate film is formed thereon with a resin-composition film obtained by adding inorganic compounds to an organic high-molecular resin that is a substrate resin.

The organic polymer that is the substrate resin of this resin-composition film should have a glass transition temperature in a range of 343° to 423° K.

At glass transistion temperatures of lower than 343° K., $O_2$ and $H_2O$ permeability of the resulting films is too increased to obtain sufficient corrosion resistance in the environment where the steel sheets are used. At glass transition temperature exceeding 423° K., on the other hand, so large is the cohesive force of the resulting films that they harden excessively and are less resistive to impacts, resulting in a lessening of adhesion. Thus, the films may crack or peel off, when the steel sheets are subjected to various workings such as bending, expansion, and drawing, leading to a drop of their corrosion resistance.

Figure 7:
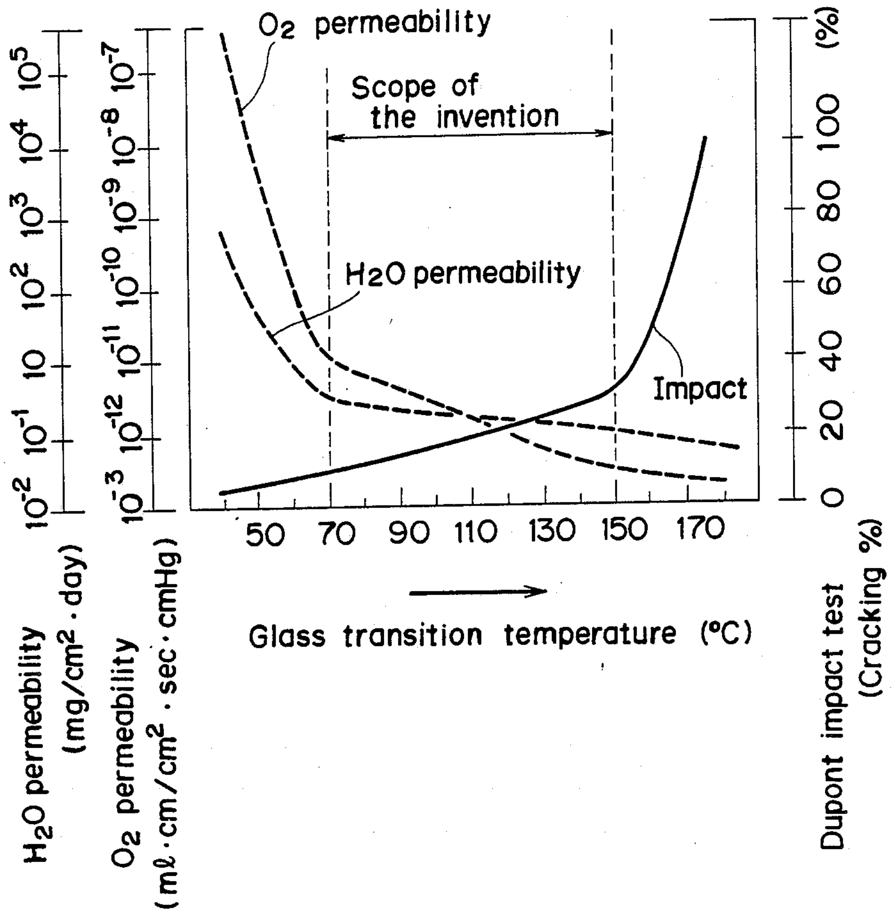
FIG. 7 shows the relationships between the glass transition temperature of the organic high molecular weight resin and the $H_2O$ permeability, $O_2$ permeability and impact cracking resistance.

FIG. 7 is illustrative of an influence of the glass trsnsition temperature upon $H_2O$ permeability, $O_2$ permeability and impact cracking resistance, and indicates that satisfactory resistance to both corrosion and impact cracking is assured by limiting the glass transition temperature to the aforesaid range.

As the organic polymers, reference may be made to, by way of example, acrylic copolymer resins, alkyd resins, epoxy resins, polybutadiene resin, phenol resins, polyurethane resins, polyamine resins and polyphenylene resins as well as mixtures or addition condensation products of two or more thereof. Of these, preference is given to the acrylic copolymers, alkyd and epoxy resins.

The acrylic copolymers are resins synthesized from ordinary unsaturated ethylenical monomers by the solution, emulsion or suspension polymerization process. Such resins contain as the essential components hard monomers such as methacrylates, acrylonitrile, styrene, acrylic acid, acrylamide and vinyltoluene, and are obtained by optional addition of other unsaturated vinyl monomers thereto for the purpose of providing hardness, flexibility and crosslinkability to the resin. These resins may also be modified with other alkyd resins, epoxy resins, phenol resins and the like.

The alkyd resins used may be known resins obtained by the ordinary synthesis processes. By way of example, reference may be made to oil-modified alkyd resins, rosin-modified alkyd resins, phenol-modified alkyd resins, styrenated alkyd resins, silicone-modified alkyd resins, acrylic-modified alkyd resins, oil-free alkyd resins (polyester resins) and so on.

As the epoxy resins, use may be made of straight epoxy resins of the epichlorohydrin, glycidyl ether and other types, fatty acid-modified epoxy resins, polybasic acid-modified epoxy resins, acrylic resin-modified epoxy resins, alkyd (or polyester)-modified resins, polybutadiene-modified resins, phenol-modified resins, amine or polyamine-modified epoxy resins, urethane-modified epoxy resins and so on.

In accordance with the present invention, hydrophobic silica is incorporated into the resin-composition film as the additive, thereby obtaining high corrosion-proofness.

Although the mechanism of improvements in corrosion-proofness by incorporation of such silica is not still clarified, it is presumed that the silica reacts with $Zn^{2+}$ eluted in corrosive environments to form stable corrosion products to inhibit pit corrosion, thereby producing an effect upon improvements in corrosion resistance over a prolonged period of time.

In general, silica is broken down into hydrophilic silica referred to as colloidal silica and fused silica and hydrophobic silica, which both have an excellent corrosion-proof effect. In particular, the hydrophobic silica is effective in improving corrosion resistance. For instance, Japanese Patent Laid-Open Publication No. 58-224174, as mentioned above, teaches that hydrophilic colloidal silica is added to organic resins. Due to its strong hydrophilic nature, however, the hydrophilic silica is less compatible with solvents and tends to incur the permeation of water. Presumably, this is responsible for a reduction in corrosion resistance, and easily causes incipient rust in wet environments in particular. The reason why the hydrophobic silica produces an excellent corrosion-proof effect is, on the contrary, considered to be that it shows satisfactory compatibility with resins during the formation of films, resulting in the formed films being uniform and firm.

In the steel sheets of the present invention, hydrophobic silica is thus incorporated into the substrate resin to enhance the compatibility with the substrate resin and obtain high corrosion resistance.

The hydrophobic silica is incorporated into the substrate resin in a weight (substrate resin to hydrophobic silica) ratio of 99:1 to 30:70, preferably 90:10 to 50:50.

When the substrate resin to silica ratio is below 99:1, the incorporation of the hydrohobic silica is expected to produce no effect upon improvements in corrosion resistance. In a ratio of higher than 30:70, on the other hand, the adhesion of double-coated films decreases. The hydrophobic silica should preferably have a particle size of suitably 1 m$\mu$ to 500 m$\mu$, particularly 5 m$\mu$ to 100 m$\mu$.

The hydrophilic silica known as colloidal silica (silica gel) or fumed silica is covered on the surface with hydroxyl groups (a silanol group

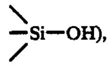

and shows hydrophilic nature. The hydrophobic silica is formed by substituting partly or almost wholly the hydrogen (H) of silanol groups of such water-disperible silica with methyl or like alkyl groups, thereby making the surface thereof hydrophobic.

The hydrophobic silica may be prepared by various methods. According to one typical method, the water-dispersible silica is permitted to react with silanes, silazanes or polysiloxanes in organic solvents such as alcohols, ketones and esters. The reaction may take place under pressure or with the application of catalysts and heat.

As such hydrophobic silica, reference may be made to, e.g., (1) colloidal silica dispersed in organic solvents such as methyl alcohol, ethyl alcohol, n-propyl alcohol, isopropyl alcohol, n-butyl alcohol, ethyl cellosolve and ethylene glycol (for instance, OSCAL 1132, 1232, 1332, 1432, 1532, 1622, 1722, 1724 manufactured by Shokubai Kasei Kagaku Kogyo, K. K. and so on), and (2) silica having its surface made hydrophobic by an organic solvent, a reactive silane compound and the like, viz., hydrophobic ultrafine silica (for instance, R974, R811, R812, R805, T805, R202, RY200, RX200 manufactured by Nihon Aerosil, K. K. and so on).

Such hydrophobic silica as mentioned above is stably dispersed in the substrate resin.

According to the invention, it is possible to incorporate a sparingly water soluble Cr compound into the resin-composition film in addition to the aforesaid hydrohobic silica, thereby further improving corrosion resistance. In corrosive environment, a slight amount of $Cr^{6+}$ is eluted out of the sparingly water soluble Cr compound in the film, and produces a passivating effect over an extended period of time to improve its corrosion resistance.

The sparingly water soluble Cr compound should be incorporated in a proportion of 1 to 30 weight parts, preferably 5 to 20 weight parts with respect to 100 weight parts of the substrate (organic high-molecular) weight resin. When the amount of the sparingly water soluble Cr compound incorporated is less than 1 weight part per 100 weight parts of the substrate resin, no effect upon improvements in corrosion resistance is expected. When that amount exceeds 30 weight parts, on the other hand, the adhesion and corrosion resistance of double- or multi-coated films decrease due to the water absorption of the sparingly water soluble Cr compound.

It is here noted that the corrosion-proof effect is increased to the highest level by the composite addition of the hydrophobic silica and sparingly water soluble Cr compound in the predetermined proportion.

As mentioned above, when $Zn^{2+}$, etc. are eluted out of the undercoat, it is presumed that the hydrophobic silica reacts with them to form stable corrosion products over the entire surface of the specimen, which serve to produce a corrosion-proof effect. On the other hand, the sparingly water soluble Cr compound releases a slight amount of $Cr^{6+}$, which is then passivated to produce a corrosion-proof effect. This effect is particularly noticeable in corrosive environments such as SST (Salt Spray Test) where continuous dissolution of the sparingly water soluble Cr compound occurs.

When contained as the rust preventive in the resin film, the sparingly water soluble Cr compound is expected to produce no appreciable corrosion-proof effect in accelerated corrosion tests wherein wet and dry conditions appear alternately, as is the case with CCT (Continuous Corrosion Test) simulating an actual corrosive environment. In test, to use hydrophobic silica as the rust preventive is rather more effective. When the accelerated tests are carried out with specimens subjected to strong working or extremely sharp cutting, however, no sufficient repairing effect is produced on injured portions by incorporating only the silica into the resin as the rust preventive.

The present inventors have found that if the silica and sparingly water soluble Cr compound different from each other in the corrosion-proof mechanism are contained in the resin in some specific proportions, it is then possible to achieve improved corrosion resistance through their synergistic effects upon corrosion-proofness.

Reference will now be made to the results of corrosion resistance tests—cycle tests to be described in Example 2 (sharp cutting, 75 cycles)—conducted with varied proportions of the substrate resin and the [hydrophobic silica+sparingly water soluble Cr compound] and varied proportions of the hydrophobic silica and sparingly water soluble Cr compound dispersed in the substrate resin. In the tests, steel sheets electroplated on one of their sides with zincnickel alloy (12% Ni-Zn) in a coating amount of 20 g/m$^2$ were used as the specimens. The chromate treatment was carried out under the conditions for the coating type chromate treatment, as will be described later, at a coating weight (on one sides) of 50 mg/m$^2$ calculated as Cr. Coating was carried out with a roll coater, followed by drying. As the substrate resin, a solvent type cation epoxy resin (resin specified in under No. 4 in Table 4) was used. The hydrophobic silica and sparingly water soluble Cr compounds used were respectively fumed silica R811 manufactured by Nihon Aerosil and $BaCrO_4$ manufactured by Kikuchi Shikiso Company.

FIG. 1 shows the results of corrosion resistance tests wherein the weight ratio of the hydrophobic silica to sparingly water soluble Cr compound was kept constant at 37:3, and the proportion of the substrate resin and the [hydrophobic silica+sparingly water soluble Cr compound] was varied between 100:0 and 0:100 in weight ratio.

Figure 2:
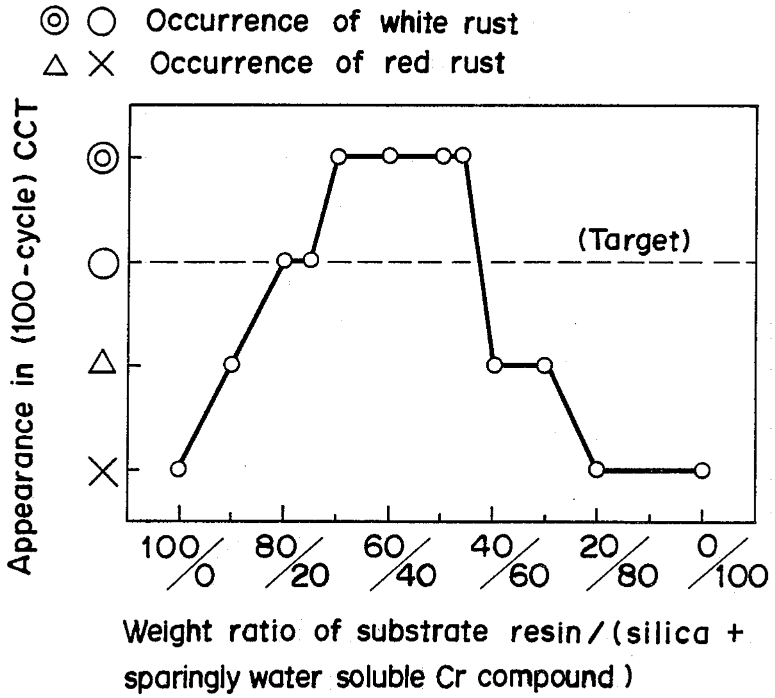

FIG. 2 shows the results of corrosion resistance tests wherein the weight ratio of the hydrophobic silica to sparingly water soluble Cr compound was kept constant at 30:10, and the proportion of the substrate resin and the [hydrophobic silica+sparingly water soluble Cr compound] was varied between 100:0 and 0:100 in weight ratio.

Figure 3:
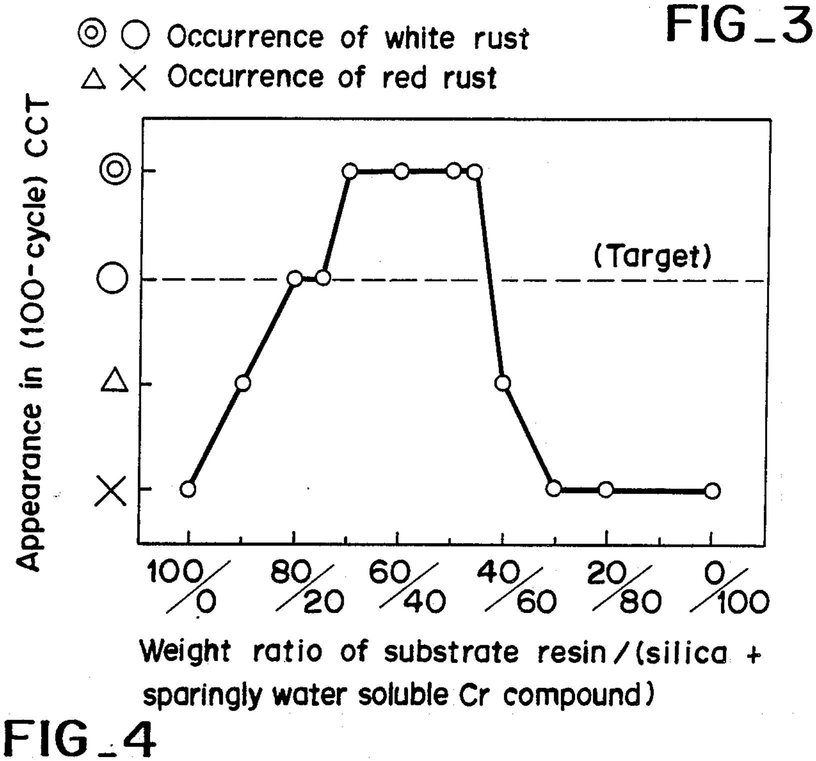

FIG. 3 shows the results of corrosion resistance tests wherein the weight ratio of the hydrophobic silica to sparingly water soluble Cr compound was kept constant at 25:15, and the proportion of the substrate resin and the [hydrophobic silica+sparingly water soluble Cr compound] was varied between 100:0 and 0:100 in weight ratio.

Figure 4:
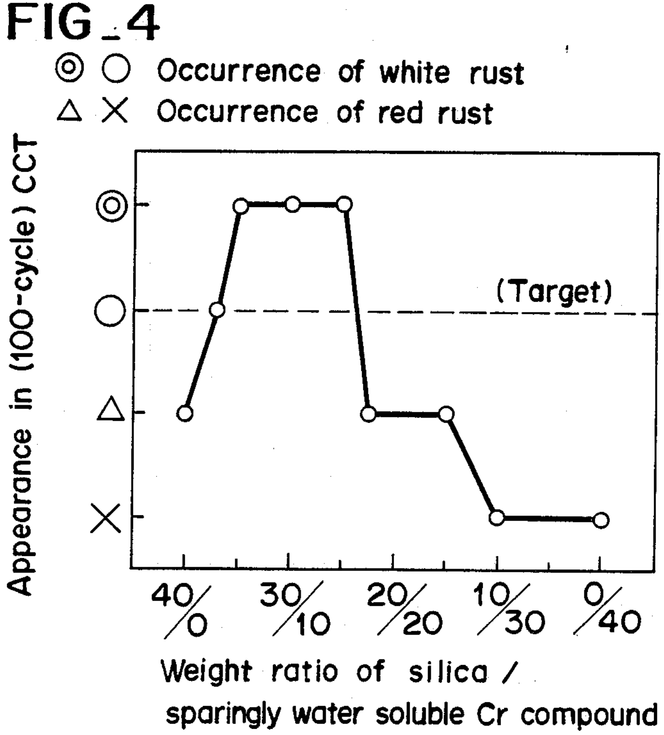
FIGS. 4 to 6 show the relationships between the silica/sparingly water soluble Cr compound and the corrosion resistance.

FIG. 4 shows the results of corrosion resistance tests wherein the weight ratio of the substrate resin to [hydrophobic silica+sparingly water soluble Cr compound] was kept constant at 80:20, and the weight ratio of the hydrophobic silica to sparingly water soluble Cr compound was varied between 40:0 and 0:40.

Figure 5:
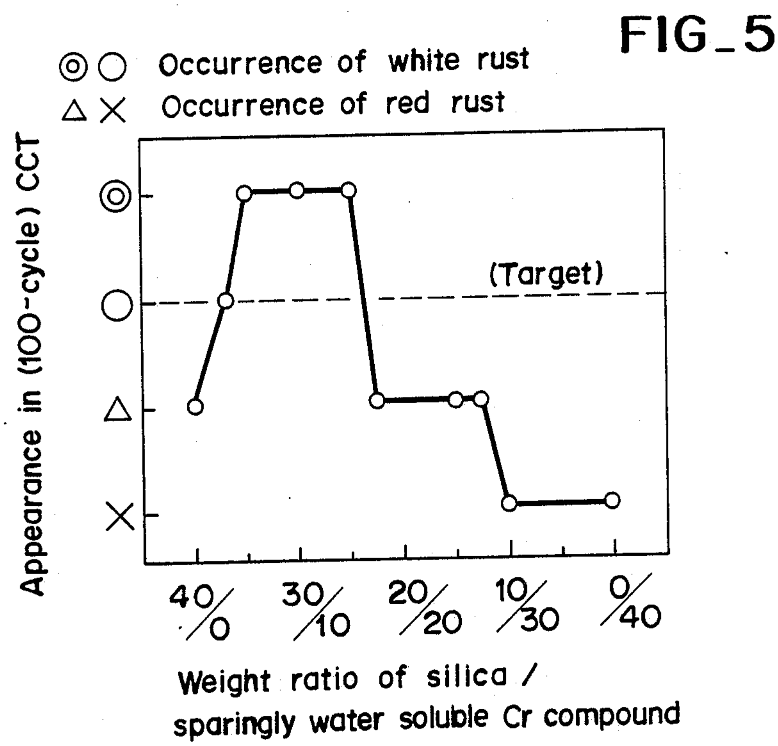

FIG. 5 shows the results of corrosion resistance tests wherein the weight ratio of the substrate resin to [hydrophobic silica+sparingly water soluble Cr compound] was kept constant at 60:40 and the weight ratio of the hydrophobic silica to sparingly water soluble Cr compound was varied between 40:0 and 0:40.

Figure 6:
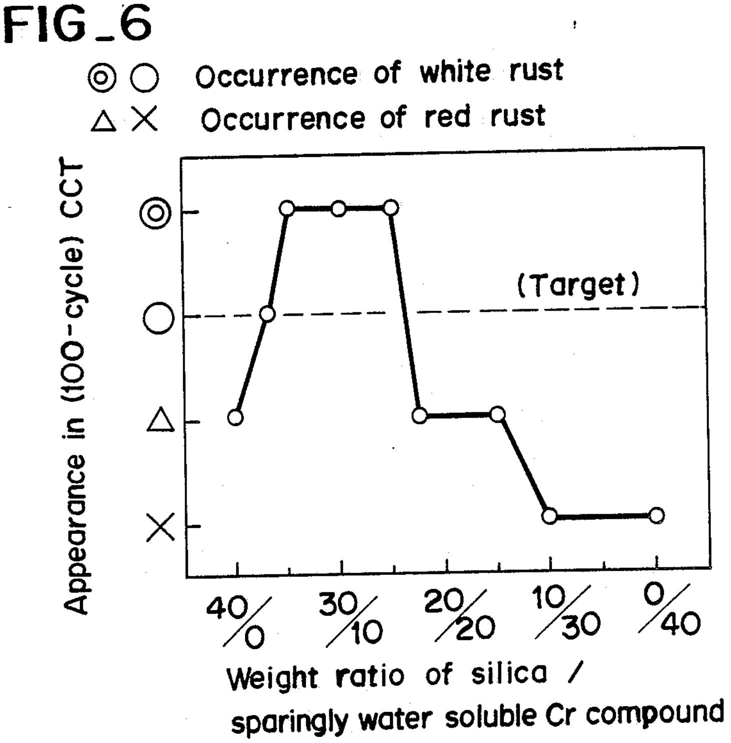

FIG. 6 shows the results of corrosion resistance tests wherein the weight ratio of the substrate resin to [hydrophobic silica+sparingly water soluble Cr compound] was kept constant at 56:44 and the weight ratio of the hydrophobic silica to sparingly water soluble Cr compound was varied between 40:0 and 0:40.

From FIGS. 1 to 6, it is evident that it is possible to achieve improved corrosion resistance by controlling the respective components to the specific ranges. More specifically, the optimum range of each component is as follows.

1. Weight Ratio of Substrate Resin: [Hydrophobic Silica+Sparingly Water Soluble Cr compound] 80:20 to 56:44, preferably 70:30 to 56:44
2. Weight Ratio of Hydrophobic Silica: Sparingly Water Soluble Cr Compound 37:3 to 25:15, preferably 35:5 to 25:15

When the amounts of the hydrophobic silica and the sparingly water soluble Cr compound are less than 80:20 as expressed in terms of the weight ratio of the substrate resin: the [hydrophobic silica+sparingly water soluble Cr compound] no sufficient corrosion resistance is obtained. At 70:30 or higher, it is possible to obtain films having the best corrosion resistance. On the other hand, when the amounts of the aforesaid additives exceed 56:44, a problem arises in connection with corrosion resistance. At 55:45 or lower, improved corrosion resistance is achieved. Therefore, the optimum weight ratio of the substrate resin: the [hydrophobic silica+sparingly water soluble Cr compound] is between 80:20 and 56:44, preferably 70:30 and 56:44.

When the weight ratio of the hydrophobic silica to sparingly water soluble Cr compound dispersed in the resin is less than 37:3, the problem that corrosion resistance is insufficient arises due to an insufficient repairing effect of $Cr^{6+}$. At 35:5, however, it is possible to obtain films having the best corrosion resistance.

When the amount of the hydrophobic silica is less than 25:15 in terms of the aforesaid weight ratio, on the other hand, the formation of stable corrosion products of the silica and $Zn^{2+}$ is too unsatisfactory to obtain satisfactory corrosion resistance. Therefore, the optimum weight ratio of the hydrophobic silica to sparingly water soluble Cr compound to be contained in the resin is between 37:3 to 25:15, preferably 35:5 to 25:15.

As the sparingly water soluble Cr compound, use may be made of powdery barium chromate ($BaCrO_4$), strontium chromate ($SrCrO_4$), lead chromate ($PbCrO_4$), zinc chromate ($ZnCrO_4.4Zn(OH)_2$), calcium chromate ($CaCrO_4$), potassium chromate ($K_2O.4ZnO.4CrO_3.3H_2O$) and silver chromate ($AgCrO_4$). One or two or more of these compounds is or are dispersed in the substrate resin.

Other chromium compounds are unsuitable for the purpose of the present invention, since they are less compatible with the substrate resin, or are poor in double-coating adhesion, although showing a corrosion-proof effect, since they contain much soluble $Cr^{6+}$.

However, it is preferred to use BaCrO4 and SrCrO4 in view of the corrosion resistance of steel sheets, if they are subjected to strong working (e.g., draw-bead tests), or are provided with sharp cuts (of about 1 mm in width).

When the surface-treated steel sheets obtained according to the present invention are actually used by the users, they may often be coated. When coating is carried out by automotive makers, pre-treatments such as surface regulation by degreasing and phosphate treatment may be carried out, as occasion arises. The surface-treated steel sheets obtained according to the present invention release Cr, although in slight amounts, at the pre-treatment steps for coating, since the chromate undercoat and the resin film contain soluble $Cr^{6+}$. When discharging waste water produced at such pretreatment steps into the surroundings, automotive makers should dispose of that waste water, since its Cr concentration is regulated by an environmental standard. Due to certain limitations imposed upon the ability of waste water disposal plants, however, it is preferred that the amount of elution of Cr is reduced. Of the sparingly water soluble Cr compound incorporated into the substrate resin, $BaCrO_4$ releases Cr at the pre-treatment steps in an amount smaller than do other chromium compounds. In view of the elution of Cr, therefore, it is preferred to use $BaCrO_4$.

In the corrosion resistance tests conducted for the determination of the weight ratios of the substrate resin to [hydrophobic silica+sparingly water soluble Cr compound] and the hydrophobic silica to sparingly water soluble Cr compound, hydrophobic fumed silica R 811 manufactured by Nihon Aerosil was used. However, similar results were obtained with the already mentioned other hydrophobic silica, provided that the weight ratio of the substrate resin to [hydrophobic silica+sparingly water soluble Cr compound] was in the range of 80:20 to 56:44, and the weight ratio of the hydrophobic silica to sparingly water soluble Cr compound was in the range of 37:3 to 25:15.

$BaCrO_4$ was used as the sparingly water soluble Cr compound, but similar results were obtained even with the use of other Cr compound e.g., $SrCrO_4$, $AgCrO_4$, $PbCrO_4$, $CaCrO_4$, $K_2O.4ZnO.4CrO_3.3H_2O$ and $ZnCrO_4.4Zn(OH)_2$ alone or in combinations, provided that the weight ratio of the substrate resin to [hydrophobic silica+sparingly water soluble Cr compound] was in the range of 80:20 to 56:44, and the weight ratio of the hydrophobic silica to sparingly water soluble Cr compound was in the range of 37:3 to 25:15.

According to the present invention, a di- or tri-alkoxysilane compound is further added to the compositions comprising the aforesaid substrate resin, hydrophobic silica and sparingly water soluble Cr compound to promote the crosslinking reaction involved. As the silane compounds capable of producing such an action and effect, reference may be made to, e.g., divinyldimethoxysilane, divinyl-β-methoxyethoxysilane, vinyltriethoxysilane, vinyl-tris (β-methoxyethoxy)silane, γ-glycidoxpropyltrimethoxysilane, γ-methacryloxypropyltrimethoxysilane, β-(3,4-epoxycyclohexyl)ethyltrimethoxysilane, N-p(aminoethyl) γ-aminopropyltriethoxysilane and γ-aminopropyltriethoxysilane.

The proportion of the silane compound added is in a range of 0.5 to 15 weight parts, preferably 1 to 10 weight parts with respect to 100 weight parts of the total weight of the solid matters of the substrate resin, hydrophobic silica and sparingly water soluble Cr components. The addition of the silane compound produces no noticeable crosslinking effect in an amount of less than 0.5 weight parts. When the silane compound is added in an amount exceeding 15 weight parts, on the other hand, any effect corresponding to that amount cannot be expected.

According to the present invention, other additives known in the art (e.g., surfactants), rust-preventing pigments such as, for instance, chrome or nonchrome base pigments, extender pigments, coloring pigments and so on may be used in addition to the aforesaid silica, sparingly water soluble Cr compound and silane compound components.

As mentioned above, the resin-composition film is formed on the chromate film in a coating weight of 0.3 to 3.0 $g/m^2$, preferably 0.5 to 2.0 $g/m^2$. No sufficient corrosion resistance is obtained in a coating weight of less than 0.3 $g/m^2$, whereas weldability (esp., continuous multi-point weldability) and electrodeposition coatability drop in a coating weight exceeding 3.0 $g/m^2$.

It is noted that cationic electrodeposition is applied to automotive bodies; however, where the wet electrical resistance of the chromate film+resin-composition film exceeds 200 $K\Omega/cm^2$, there is a problem that electrodeposition coating does not give satisfactory films. In applications of automotive bodies, therefore, it is preferable to form both the chromate and resin-composition films in such a manner that their wet electrical resistance is limited to at most 200 $K\Omega/cm^2$.

The present invention includes steel sheets, one or both sides of which may be of the film structure as mentioned above.

The present invention is applied to the steel sheets for automotive bodies, but is also effectively applicable to the highly corrosion-resistant, surface-treated steel sheets for household electrical appliances, building materials and so on.

The steel sheets of the present invention may be coated on one or both sides in the following manners, by way of example.

1. One side: coated with a combination of plated-chromate-resincomposition films. The other side: uncoated.

2. One side: coated with a combination of plated-chromate-resincomposition films. The other side: plated.

3. Both sides: coated with a combination of plated-chromate-resincomposition films.

EXAMPLES

Example 1

Adhesion and corrosion resistance tests were conducted with the present products obtained using different plating components and varied coating weights of films, as set forth in Table 1. For the purpose of comparison, similar tests were carried out with the steel sheets shown in Table 2.

After plating, each steel sheet was degreased with an alkali, followed by water washing and drying. The sheet was coated with the coating type chromate treatment liquid by means of a roll coater, or was immersed in an electrolytic chromate treatment bath, thereby forming an electrolytic chromate film. After drying, the resin liquid was coated on that film as the second film. After drying, the product was heat-treated and air-cooled. The conditions for the coating type and electrolytic chromate treatments are as follows.

Conditions for Coating Type Chromate Treatment

A chromate treatment liquid of $Cr^{3+}/Cr^{6+}=\frac{2}{3}$ and pH=2.5 was coated on each plated steel sheet at normal temperature by means of a roll coater, followed by drying.

Conditions for Electrolytic Chromate Treatment

Cathodic electrolysis was carried in a bath containing 50 g/l of $CrO_3$ and 0.5 g/l of $H_2SO_4$ at a bath temperature of 50° C. and a current density of 4.9 $A/dm^2$ for an electrolysis time of 2.0 sec., followed by water washing and drying.

Table 3 shows the compositions for forming the second films used in Example 1. The contents of the compositions of the examples in Tables 1 and 2 are indicated by numbers in Table 3. Tables 4 to 7 indicate the substrate resin, silica, chromium and silane compounds used for the compositions of Table 3. The contents of the aforesaid components forming the compositions in Table 3 are indicated by numbers in Tables 4 to 7.

The compositions of the second films and the components forming them in Example 1 were prepared in the following manners.

Synthesis of Organic Polymers

Synthesis Example 1

Synthesis of Acrylic Copolymer Resin 180 parts of isopropyl alcohol were put in an one-liter four-necked flask equipped with a thermometer, a stirrer, a condenser and a dropping funnel. After nitrogen replacement, the interior temperature of the flask was regulated to about 85° C. Afterwards, a monomer mixture consisting of 180 parts of methyl methacrylate, 15 parts of ethyl methacrylate, 30 parts of n-butyl methacrylate, 30 parts of styrene, 30 parts of N-n-butoxyethyl methacrylate and 15 parts of hydroxyethyl methacrylate were added dropwise into the flask with a catalyst comprising 6 parts of 2,2-azobis(2,4-dimethylvaleronitrile) over about 2 hours. After the completion of the dropwise addition, the reaction was continued at that temperature for further five hours to obtain a colorless, transparent resin solution having a solid content of about 63%.

Synthesis Example 2

Synthesis of Acrylic Copolymer Resin

Except that 30 parts of methyl methacrylate, 198 parts of isobutyl acrylate, 30 parts of N-n-butoxymethylacrylamide, 15 parts of hydroxyethyl methacrylate and 27 parts of acrylic acid were used as the acrylic monomers, synthesis was carried out under conditions similar to those in Synthesis Example 1 to obtain a colorless, transparent resin solution having a solid content of 61%.

Synthesis Example 3

Synthesis of Oil-Free Polyester 15 parts of adipic acid, 15 parts of phthalic anhydride, 125 parts of isophthalic acid, 87 parts of trimethylolpropane, 31 parts of neopentyl glycol, 6 parts of 1,6-hexanediol and 0.02 parts of monobutyl tin hydroxide were added into one-liter four-necked flask having a thermometer, a stirrer and a condenser, and were elevated to 160° C. over about 2 hours, while stirring was carried out in a nitrogen stream. Subsequently, the supply of the nitrogen stream was interrupted, and the flask was elevated to 240° C. over further 4 hours. In the meantime, the reaction was continued, while the reaction condensed water was removed. After the reaction had been continued at a temperature of 240° C. for further 2 hours, 8.4 parts of xylene were added. After the condensation reaction had been allowed to take place under reflux at that temperature for 2 hours, the reaction product was cooled with the addition of 160 parts of a dimethyl ester solvent and 100 parts of a cyclohexanone solvent, thereby obtaining a colorless, transparent resin solution having a solid content of about 50%.

Synthesis Example 4

Synthesis of Epoxy Resin 225 parts of Epicoat 1004 (epoxy resin having a molecular weight of about 1,500 and manufactured by Shell Kagaku, K. K.), 100 parts of methyl isobutyl ketone and 100 parts of xylene were put in one-liter four-necked flask provided with a thermometer, a stirrer, a condenser and a dropping funnel, and were uniformly dissolved at a temperature of 180° C. in a nitrogen stream. The solution was then cooled down to 70° C., followed by the dropwise addition of 21 parts of di(n-propanol)amine over 30 minutes. After the completion of the dropwise addition, the reaction was continued at 120° C. for 2 hours with the application of heat to obtain a colorless, transparent resin solution having a solid content of about 51%.

Hardening Agent

Synthesis of Blocked Isophorone Diisocyanate

Into a reaction vessel including a thermometer, a stirrer and a reflux condenser provided with a dropping funnel there were placed 222 parts of isophorone diisocyanate, to which 100 parts of methyl isobutyl ketone were added. After uniform dissolution, 88 parts of a 50% solution of trimethylolpropane in methyl isobutyl ketone were added dropwise to the isocyanate solution maintained at 70° C. under agitation from said dropping funnel over one hour. Afterwards, the solution was maintained at 70° C. for 1 hour and, then, at 90° C. for 1 hour. Thereafter, 230 parts of n-butyl alcohol were added for 3-hour reaction at 90° C. to obtain blocked isocyanate. This hardening agent had an effective component of 76%.

Resin Compositions

For use in the examples, the hardening agents, if required, were added to the organic high-molecular weight resins synthesized in the manner as mentioned above and commercially available resins. Their porportions and the glass transition temperatures of the hardened films are shown in Table 4.

Compositions for Forming Films

Added to the aforesaid resin compositions were the hydrophobic silica specified in Table 5, the chromium compounds specified in Table 6 and the alkoxysilane compounds specified in Table 7 to prepare the compositions for use in the examples, which are indicated in Table 3. The corrosion resistance and adhesion tests were conducted in the following manners.

Referring first to the post-working corrosion resistance tests, draw-bead working (bead apex angle: 60°, bead apex R:0.5, bead height: 5 mm, specimen size: 25 mm×300 mm, draw rate: 200 mm/min., and pressing force: 250 Kg) was carried out. Thereafter, a cycle of saline spray (with a 5% saline solution at 35° C. for 3 hours) - drying (at 60° C. for 2 hours) - wetting (at 95% RH and 50° C. for 3 hours) was repeated 50 times.

Turning to the adhesion tests, a coating material for cationic electrodeposition (Electron No. 9450 manufactured by Kansai Paint, K. K.) was electrodeposited on the sample to a thickness of 20 micrometers, and an aminoalkyd coating material (Amirack No. 002 manufactured by Kansai Paint, K. K.) was spray-coated thereon to a thickness of 30 micrometers for primary and secondary adhesion tests. In accordance with the primary adhesion test, each specimen was provided on its film surface with 100 squares at an interval of 1 mm, on and from which an adhesive tape was then applied and peeled. In accordance with the secondary adhesion test, each specimen was coated and, then, immersed in warm water (pure water) of 40° C. for 240 hours, followed by its removal. After the lapse of 24 hours, the specimen was similarly provided with squares at an interval of 2 mm, on and from which an adhesive tape was applied and peeled.

For the post-coating corrosion resistance, an 100-cycle test was carried out with a specimen which had been electrodeposited and provided with crosscuts. The results of the tests were estimated on the following bases.

1. Post-Working Corrosion Resistance of Uncoated Specimens

◎: No red rust occurred.
○+: Less than 5% of red rust found.
○: 5% to less than 10% of red rust found.
○−: 10% to less than 20% of red rust found.l
Δ: 20% to less than 50% of red rust found.
×: 50% or more of red rust found.

2. Post-Coating Corrosion Resistance

◎: Blister Width—less than 0.5 mm.
○+: Blister Width—0.5 mm to less than 2.0 mm.
○: Blister Width —1.0 mm to less than 2.0 mm.
○−: Blister Width—2.0 mm to less than 3.0 mm.
α: Blister Width —3.0 mm to less than 5.0 mm.
×: Blister Width—5.0 mm or more.

3. Double-Coating Adhesion

◎: Peel Area—0%.
○+: Peel Area—less than 5%.
○: Peel Area—5% to less than 10%.
○−: Peel Area—10% to less than 20%.
α: Peel Area—20% to less than 50%.
×: Peel Area—50% or more.

TABLE 1

| No | Steel sheet Type | Steel sheet A (g/m²) | Chromate film Type | Chromate film B (mg/m²) | Composition for forming films No. (Table 3) | Composition for forming films C (g/m²) | Composition for forming films D (°C.) | E (50 cycles) | F (100 cycles) | Multi-coating adhesion G | Multi-coating adhesion H | Remarks |
|---|---|---|---|---|---|---|---|---|---|---|---|---|
| 1 | Ni—Zn plating | 20 | Coating Type | 50 | 1 | 0.9 | 150 | ○−~Δ | ○+ | ◎ | ◎ | |
| 2 | Ni—Zn plating | " | Coating Type | " | 2 | " | " | ○− | ◎ | ◎ | ◎ | |
| 3 | Ni—Zn plating | " | Coating Type | " | 3 | " | " | ○−~Δ | ◎ | ◎ | ◎ | |

TABLE 1-continued

| No | Steel sheet Type | A (g/m²) | Chromate film Type | B (mg/m²) | Composition for forming films No. (Table 3) | C (g/m²) | D (°C.) | E (50 cycles) | F (100 cycles) | Multi-coating adhesion G | H | Remarks |
|---|---|---|---|---|---|---|---|---|---|---|---|---|
| 4 | Ni—Zn plating | " | Coating Type | " | 4 | " | " | ○–~Δ | ○+ | ⊙ | ⊙ | |
| 5 | Ni—Zn plating | " | Coating Type | " | 5 | " | " | ○ | ⊙ | ⊙ | ⊙ | |
| 6 | Ni—Zn plating | " | Coating Type | " | 6 | " | " | ◎ | ⊙ | ⊙ | ⊙ | |
| 7 | Ni—Zn plating | " | Coating Type | " | 7 | " | " | ○– | ⊙ | ⊙ | ⊙ | |
| 8 | Ni—Zn plating | " | Coating Type | " | 8 | " | " | ○ | ⊙ | ⊙ | ⊙ | |
| 9 | Ni—Zn plating | " | Coating Type | " | 9 | " | " | ◎ | ⊙ | ⊙ | ⊙ | |
| 10 | Ni—Zn plating | " | Coating Type | " | 10 | " | " | ○–~Δ | ○+ | ⊙ | ⊙ | |
| 11 | Ni—Zn plating | " | Coating Type | " | 11 | " | " | ○– | ⊙ | ⊙ | ⊙ | |
| 12 | Ni—Zn plating | " | Coating Type | " | 12 | " | " | ○–~Δ | ⊙ | ⊙ | ⊙ | |
| 13 | Ni—Zn plating | " | Coating Type | " | 13 | " | " | ○~○– | ⊙ | ⊙ | ⊙ | |
| 14 | Ni—Zn plating | " | Coating Type | " | 14 | " | " | ○ | ⊙ | ⊙ | ⊙ | |
| 15 | Ni—Zn plating | " | Coating Type | " | 15 | " | " | ○ | ⊙ | ⊙ | ⊙ | |
| 16 | Ni—Zn plating | " | Coating Type | " | 16 | " | " | ◎ | ⊙ | ⊙ | ⊙ | |
| 17 | Ni—Zn plating | " | Coating Type | " | 17 | " | " | ◎ | ⊙ | ⊙ | ⊙ | |
| 18 | Ni—Zn plating | " | Coating Type | " | " | 0.3 | " | ○ | ⊙ | ⊙ | ⊙ | |
| 19 | Ni—Zn plating | " | Coating Type | " | " | 3.0 | " | ◎ | ⊙ | ⊙ | ⊙ | |
| 20 | Ni—Zn plating | " | Coating Type | " | " | 0.9 | 100 | ⊙ | ⊙ | ⊙ | ⊙ | |
| 21 | Ni—Zn plating | " | Coating Type | 25 | " | " | 150 | ⊙ | ⊙ | ⊙ | ⊙ | |
| 22 | Ni—Zn plating | " | Coating Type | 100 | " | " | " | ⊙ | ⊙ | ⊙ | ⊙ | |
| 23 | Ni—Zn plating | " | Coating Type | 50 | 18 | " | " | ⊙ | ⊙ | ⊙ | ⊙ | |
| 24 | Ni—Zn plating | " | Coating Type | " | 19 | " | " | ⊙ | ⊙ | ⊙ | ⊙ | |
| 25 | Ni—Zn plating | " | Coating Type | " | 20 | " | " | ⊙ | ⊙ | ⊙ | ⊙ | |
| 26 | Ni—Zn plating | " | I Type | " | 17 | " | " | ⊙ | ⊙ | ⊙ | ⊙ | |
| 27 | Fe—Zn plating | 40 | Coating Type | " | " | " | " | ○–~Δ | ○ | ⊙ | ⊙ | |
| 28 | Mn—Zn plating | " | | | | | | ○ | ○ | ⊙ | ⊙ | |
| 29 | Zn plating | " | Coating Type | " | " | " | " | Δ | ○–~Δ | ⊙ | ⊙ | |

Note
A: Deposit amount;
B: Chromium deposit amount;
C: Film thickness;
D: Baking temperature;
E: Post-working corrosion resistance;
F: Post-coating corrosion resistance;
G: Initial adhesion;
H: Adhesion in warm water
I: Electrolytic type

TABLE 2

| No | Steel sheet Type | A (g/m²) | Chromate film Type | B (mg/m²) | Composition for forming films No. (Table 3) | C (g/m²) | D (°C.) | E (50 cycles) | F (100 cycles) | Multi-coating adhesion G | H | Remarks |
|---|---|---|---|---|---|---|---|---|---|---|---|---|
| 1 | Ni—Zn plating | 20 | Coating Type | 50 | 21 | 0.9 | 150 | x | x | ○ | ○– | |
| 2 | Ni—Zn plating | " | Coating Type | " | 22 | " | " | Δ~x | Δ~x | ○ | ○ | |
| 3 | Ni—Zn plating | " | Coating Type | " | 23 | " | " | Δ | ○ | ⊙ | ⊙ | |
| 4 | Ni—Zn plating | " | Coating Type | " | 24 | " | " | x | x | ○ | ○– | |

TABLE 2-continued

| | Steel sheet | | Chromate film | | Composition for forming films | | | E | F | Multi-coating adhesion | | |
|---|---|---|---|---|---|---|---|---|---|---|---|---|
| No | Type | A (g/m²) | Type | B (mg/m²) | No. (Table 3) | C (g/m²) | D (°C.) | (50 cycles) | (100 cycles) | G | H | Remarks |
| 5 | Ni—Zn plating | " | Coating Type | " | 25 | " | " | Δ | ○ | ○ | ○ | |
| 6 | Ni—Zn plating | " | Coating Type | " | 26 | " | " | x | x | ○ | ○ | |
| 7 | Ni—Zn plating | " | Coating Type | " | 27 | " | " | Δ | ○+ | ◎ | ◎ | |
| 8 | Ni—Zn plating | " | Coating Type | " | 28 | " | " | Δ | Δ | ◎ | ◎ | |
| 9 | Ni—Zn plating | " | Coating Type | " | 29 | " | " | ○− | ○+ | ◎ | ◎ | |
| 10 | Ni—Zn plating | " | Coating Type | " | 30 | " | " | ○− | ○+ | ◎ | ◎ | |
| 11 | Ni—Zn plating | " | Coating Type | " | 31 | " | " | Δ~x | Δ | ◎ | ◎ | |
| 12 | Ni—Zn plating | " | Coating Type | " | 32 | " | " | Δ | ○− | ◎ | ◎ | |
| 13 | Ni—Zn plating | " | Coating Type | " | 33 | " | " | ○− | ○+ | ◎ | ◎ | |
| 14 | Ni—Zn plating | " | Coating Type | " | 17 | 0.1 | " | x | x | ◎ | ◎ | |
| 15 | Ni—Zn plating | " | Coating Type | " | 17 | 4.0 | " | ◎ | ◎ | ◎ | ◎ | J |
| 16 | Ni—Zn plating | " | Coating Type | 1500 | 17 | 0.9 | " | ○− | ◎ | ◎ | ◎ | J + K |
| 17 | Ni—Zn plating | " | Coating Type | 50 | 17 | " | 30 | Δ~x | Δ | ◎ | ◎ | |
| 18 | Ni—Zn plating | " | Coating Type | " | " | " | 200 | ◎ | ◎ | ◎ | ◎ | L |
| 19 | Fe—Zn plating | 40 | Coating Type | " | 28 | " | 150 | x | Δ | ◎ | ◎ | |
| 20 | Mn—Zn plating | 20 | Coating Type | " | " | " | " | Δ | ○− | ◎ | ◎ | |
| 21 | Zn plating | 40 | Coating Type | " | " | " | " | x | x | ◎ | ◎ | |

Note
A through H: Same as those of Table 1
J: Inferior spot weldability
K: Peeling of film during pressing
L: Inferior BH properties

TABLE 3

| | Resin compositions | | Silica | | Chromium compounds | | Silan compounds | |
|---|---|---|---|---|---|---|---|---|
| No. | No. (Table 4) | M *1 | No. (Table 5) | Weight part *1 | No. (Table 6) | Weight part *1*2 | No. Table 7 | Weight part *1*3 |
| 1 | 1 | 90 | 1 | 10 | — | — | — | — |
| 2 | 2 | 70 | 2 | 30 | — | — | — | — |
| 3 | 2 | 50 | 2 | 50 | — | — | — | — |
| 4 | 2 | 30 | 2 | 70 | — | — | — | — |
| 5 | 2 | 70 | 2 | 30 | 1 | 10 | — | — |
| 6 | 2 | 70 | 2 | 30 | 1 | 10 | 1 | 5 |
| 7 | 3 | 70 | 3 | 30 | — | — | — | — |
| 8 | 3 | 70 | 3 | 30 | 2 | 5 | — | — |
| 9 | 3 | 70 | 3 | 30 | 3 | 30 | 1 | 10 |
| 10 | 4 | 95 | 3 | 5 | — | — | — | — |
| 11 | 4 | 70 | 3 | 30 | — | — | — | — |
| 12 | 4 | 50 | 3 | 50 | — | — | — | — |
| 13 | 4 | 70 | 3 | 30 | 1 | 1 | — | — |
| 14 | 4 | 70 | 3 | 30 | 1 | 20 | — | — |
| 15 | 4 | 70 | 3 | 30 | 4 | 30 | — | — |
| 16 | 4 | 70 | 3 | 30 | 1 | 10 | 2 | 1 |
| 17 | 4 | 70 | 3 | 30 | 1 | 10 | 2 | 5 |
| 18 | 4 | 70 | 3 | 30 | 1 | 10 | 2 | 15 |
| 19 | 5 | 70 | 4 | 30 | 5 | 10 | 2 | 5 |
| 20 | 5 | 70 | 4 | 30 | 6 | 5 | 2 | 10 |
| 21 | 2 | 100 | — | — | — | — | — | — |
| 22 | 2 | 10 | 3 | 90 | — | — | — | — |
| 23 | 2 | 70 | 5 | 30 | — | — | — | — |
| 24 | 3 | 100 | — | — | — | — | — | — |
| 25 | 3 | 100 | — | — | 1 | 10 | — | — |
| 26 | 4 | 100 | — | — | — | — | — | — |
| 27 | 4 | 100 | — | — | 1 | 10 | 2 | 5 |
| 28 | 6 | 70 | 2 | 30 | — | — | — | — |
| 29 | 6 | 70 | 2 | 30 | 1 | 10 | — | — |
| 30 | 6 | 70 | 2 | 30 | 1 | 10 | 1 | 5 |

TABLE 3-continued

| | Resin compositions | | Silica | | Chromium compounds | | Silan compounds | |
|---|---|---|---|---|---|---|---|---|
| No. | No. (Table 4) | M *1 | No. (Table 5) | Weight part *1 | No. (Table 6) | Weight part *1*2 | No. Table 7 | Weight part *1*3 |
| 31 | 7 | 70 | 3 | 30 | — | — | — | — |
| 32 | 7 | 70 | 3 | 30 | 1 | 20 | — | — |
| 33 | 7 | 70 | 3 | 30 | 1 | 10 | 2 | 5 |

Note
M: Weight parts of substrate resin
*1: Weight parts of solid matters
*2: Proportion of resin compositions per 100 weight parts os substrate resin
*3: Per 100 weight parts of (substrate resin + silica + chromium compound)

TABLE 4

| No. | Organic high-molecular resin (substrate resin) | Hardening agent | Glass transition temperature of hardened films (°K.) |
|---|---|---|---|
| 1 | Synthetic example (1) 100 parts | — | 347 |
| 2 | Synthetic example (1) 100 parts | Methylated melamine resin A 20 parts | 365 |
| 3 | Synthetic example (3) 100 parts | Methylated melamine resin B 20 parts | 373 |
| 4 | Synthetic example (4) 100 parts | Synthetic example 1 10 parts Dibutyl tin dilaurate 0.2 parts | 393 |
| 5 | Epoxy resin A 100 parts | Ethylene-diamine 20 parts | 415 |
| 6 | Synthetic example (2) 100 parts | Methylated melamine resin A 20 parts | 305 |
| 7 | Epoxy resin B 100 parts | Ethylene-diamine 5 parts | 446 |

*1 Weight parts of solid matters
*2 Methylated melamine resin A (Trade name Simel 325 manufactured by Mitsui Toatsu)
*3 Methylated melamine resin B (Trade name Simel 303 manufactured by Mitsui Toatsu)
*4 Epoxy resin A (Trade name Epicoat 1004 manufactured by Shell Kagaku)
*5 Epoxy resin B (Trade name Epicoat 828 manufactured by Shell Kagaku)

TABLE 5

| No. | Additives |
|---|---|
| 1 | Colloidal silica dispersed in organic solvent (OSCAL 1432 manufactured by Shokubai Kasei) |
| 2 | Colloidal silica dispersed in organic solvent (OSCAL 1622 manufactured by Shokubai Kasei) |
| 3 | Hydrohobic ultrafine silica (R 811 manufactured by Nihon Aerosil) |
| 4 | Hydrophobic ultrafine silica (R 805 manufactured by Nihon Aerosil) |
| 5 | Hydrophilic ultrafine silica (R 200 manufactured by Nihon Aerosil) |

TABLE 6

| No. | Chromate compounds |
|---|---|
| 1 | Strontium chromate (Kikuchi Shikiso Kogyo) |
| 2 | Lead chromate (Kikuchi Shikiso Kogyo) |
| 3 | Zinc chromate (Kikuchi Shikiso Kogyo) |
| 4 | Barium chromate (Kikuchi Shikiso Kogyo) |
| 5 | Calcium chromate (Kikuchi Shikiso Kogyo) |
| 6 | Zinc potassium Chromate (Kikuchi Shikiso Kogyo) |

TABLE 6-continued

| No. | Chromate compounds |
|---|---|
| 7 | Silver chromate (Kanto Kagaku) |
| 8 | Potassium chromate (Nihon Kagaku Kogyo) |

TABLE 7

| No. | Type |
|---|---|
| 1 | γ-methacryloxypropyltrimethoxysilane (Shinetsu Kagaku) |
| 2 | γ-glycidopropyltrimethoxysilane (Shinetsu Kagaku) |

EXAMPLE 2

Adhesion and corrosion resistance tests were conducted with the present products obtained using different plating components and varied coating weights of films, as set forth in Table 8. For the purpose of comparison, similar tests were carried out with the steel sheets shown in Table 9.

After plating, each steel sheet was degreased with an alkali, followed by water washing and drying. The sheet was coated with the coating type chromate treatment liquid by means of a roll coater, or was immersed in an electrolytic chromate treatment bath, thereby forming an electrolytic chromate film. After drying, the resin liquid was coated on that film as the second film. After drying, the product was heat-treated and air-cooled. The conditions for the coating type and electrolytic chromate treatments are as follows.

Conditions for Coating Type Chromate Treatment

The same as in Example 1.

Conditions for Electrolytic Chromate Treatment

Cathodic electrolysis was carried in a bath containing 50 g/l of $CrO_3$ and 0.5 g/l of $H_2SO_4$ at a bath temperature of 50° C. and a current density of 4.9 A/dm$^2$ for an electrolysis time varied depending upon the target coating weigth of Cr, followed by water washing and drying.

The compostions and constituents of the second layer used in the instant example are similar to those in Example 1.

Corrosion resistance and adhesion tests were carried out in the following manners.

Conducted were the following cycle tests, one cycle of which involved:

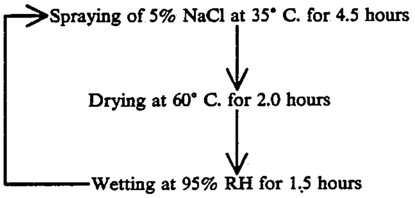

Post-Working CCT

After draw-bead working (bead apex angle: 60°, apex R: 0.5, bead height: 5 mm, specimen size: 25 mm+30 mm, a draw rate: 200 mm/min., and pressing force: 250 Kg), the tests were carried out by 100 cycles.

Flat Sheet CCT

The tests were conducted by 250 cycles, using flat sheet specimens as such.

Sharply-Cut CCT

The tests were conducted by 50 cycles, using flat sheet specimens which were provided thereover with sharp cuts (crosscuts of about 1 mm in width).

Adhesion

The same as in Example 1.

Cr Elution Tests

Using a degreasing agent FC-L 4410 manufactured by Nihon Parker Rising under standard conditions, each specimen was degreased in an effective test area of 0.6 $m^2$ with respect to 1 liter of the degreasing liquid to determine the amount of Cr in that liquid by atomic absorption.

The results of the tests were estimated on the following bases.

1. Uncoated Corrosion Resistance (common to post-working CCT, flat-sheet CCT and sharply-cut CCT)

⊚: No red rust occurred.
○ : less than 5% of red rust found.
○ : 5% to less than 10% of red rust found.
○ —: 10% to less than 20% of red rust found.
Δ: 20% to less than 50% of red rust found.
×: 50% or more of red rust found.

2. Double-Coating Adhesion

The same as in Example 1.

3. Cr Elution

⊚: Amount of Cr in the degreasing liquid—less than 2 ppm.
○: Amount of Cr in the degreasing liquid—2 ppm to less than 6 ppm.
Δ: Amount of Cr in the degreasing liquid—6 ppm to less than 12 ppm.
×: Amount of Cr in the degreasing liquid—12 ppm or more.

TABLE 8

| No. | Steel sheet *1 | Chromate film Type | Chromate film B(mg/m²) | Resin film M *2 | Resin film Silica compound Type *3 | Resin film Silica compound N | Resin film O Type *4 | Resin film P | Resin film M/Q *5 | Resin film Silica R *6 | Resin film Silane compound Type *7 | Resin film Silane compound T *8 | U(g/m²) | D (°C.) | Corrosion resistance V CCT | Corrosion resistance W CCT | Corrosion resistance X CCT | Multi-coating Y | Multi-coating G | Multi-coating H | Remark |
|---|---|---|---|---|---|---|---|---|---|---|---|---|---|---|---|---|---|---|---|---|---|
| Examples of Invention | | | | | | | | | | | | | | | | | | | | | |
| 1 | A | Coating Type | 50 | (4) | (3) | 67/33 | (4) | 17 | 60/40 | 30/10 | — | — | 1.0 | 70 | ◎ | ○+ | ○+ | ◎ | ◎ | ◎ | |
| 2 | " | Coating Type | " | " | " | " | " | " | " | " | — | — | " | 150 | ◎ | ○+ | ○+ | ◎ | ◎ | ◎ | |
| 3 | " | Coating Type | " | " | " | " | " | " | " | " | — | — | 0.3 | " | ◎ | ○+ | ○ | ◎ | ◎ | ◎ | |
| 4 | " | Coating Type | " | " | " | " | " | " | " | " | — | — | 0.5 | " | ◎ | ○+ | ○+ | ◎ | ◎ | ◎ | |
| 5 | " | Coating Type | " | " | " | " | " | " | " | " | — | — | 2.0 | " | ◎ | ○+ | ○+ | ◎ | ◎ | ◎ | |
| 6 | " | Coating Type | " | " | " | " | " | " | " | " | — | — | 3.0 | " | ◎ | ○+ | ○+ | ◎ | ◎ | ◎ | Z |
| 7 | " | Coating Type | " | " | " | 80/20 | " | 8 | 75/25 | " | — | — | 1.0 | " | ◎ | ○ | ○ | ◎ | ◎ | ◎ | |
| 8 | " | Coating Type | " | " | " | 76/24 | " | 11 | 70/30 | " | — | — | " | " | ◎ | ○+ | ○+ | ◎ | ◎ | ◎ | |
| 9 | " | Coating Type | " | " | " | 63/37 | " | 20 | 56/44 | " | — | — | " | " | ◎ | ○+ | ○+ | ◎ | ◎ | ◎ | |
| 10 | " | Coating Type | " | " | " | 62/38 | " | 5 | 60/40 | 37/3 | — | — | " | " | ◎ | ○ | ○+ | ◎ | ◎ | ◎ | |
| 11 | " | Coating Type | " | " | " | 63/37 | " | 8 | " | 35/5 | — | — | " | " | ◎ | ○+ | ○+ | ◎ | ◎ | ◎ | |
| 12 | " | Coating Type | " | " | " | 71/29 | " | 25 | " | 25/15 | — | — | " | " | ◎ | ○+ | ○+ | ◎ | ◎ | ◎ | |
| 13 | " | Coating Type | " | " | (1) | 67/33 | " | 17 | | 30/10 | — | — | " | " | ◎ | ○+ | ○+ | ◎ | ◎ | ◎ | |
| 14 | " | Coating Type | " | " | (2) | " | " | " | " | " | — | — | " | " | ◎ | ○+ | ○+ | ◎ | ◎ | ◎ | |
| 15 | " | Coating Type | " | " | (4) | " | " | " | " | " | — | — | " | " | ◎ | ○+ | ○+ | ◎ | ◎ | ◎ | |
| 16 | " | Coat- | " | " | (3) | " | (1) | " | " | " | — | — | " | " | ◎ | ○+ | ○+ | ○ | ◎ | ◎ | |

TABLE 8-continued

| No. | Steel sheet *1 | Chromate film Type | Chromate film B(mg/m²) | Resin film M *2 | Silica compound Type *3 | Silica compound N | O Type *4 | P | M/Q *5 | Silica R *6 | Silane compound Type *7 | Silane compound T *8 | U(g/m²) | D (°C.) | Corrosion resistance V CCT | Corrosion resistance W CCT | Corrosion resistance X CCT | Multi-coating Y | Multi-coating G | Multi-coating H | Remark |
|---|---|---|---|---|---|---|---|---|---|---|---|---|---|---|---|---|---|---|---|---|---|
| 17 | " | Coating Type | " | " | " | " | (2) | " | " | " | — | — | " | " | ⊙ | ○ | ○ | ○ | ⊙ | ⊙ | |
| 18 | " | Coating Type | " | " | " | " | (3) | " | " | " | — | — | " | " | ⊙ | ○ | ○ | ⊙ | ⊙ | ⊙ | |
| 19 | " | Coating Type | " | " | " | " | (5) | " | " | " | — | — | " | " | ⊙ | ○ | ○ | ⊙ | ⊙ | ⊙ | |
| 20 | " | Coating Type | " | " | " | " | (6) | " | " | " | — | — | " | " | ⊙ | ○ | ○ | ○ | ⊙ | ⊙ | |
| 21 | " | Coating Type | " | " | " | " | (7) | " | " | " | — | — | " | " | ⊙ | ○ | ○ | ○ | ⊙ | ⊙ | |
| 22 | " | Coating Type | " | (1) | " | " | (4) | " | " | " | — | — | " | " | ⊙ | ○+ | ○ + | ⊙ | ⊙ | ⊙ | |
| 23 | " | Coating Type | " | (2) | " | " | " | " | " | " | — | — | " | " | ⊙ | ○+ | ○ + | ⊙ | ⊙ | ⊙ | |
| 24 | " | Coating Type | " | (3) | " | " | " | " | " | " | — | — | " | " | ⊙ | ○+ | + | ⊙ | ⊙ | ⊙ | |
| 25 | " | Coating Type | " | (5) | " | " | " | " | " | " | — | — | " | " | ⊙ | ○+ | ○ + | ⊙ | ⊙ | ⊙ | |
| 26 | " | Coating Type | " | (4) | " | " | " | " | " | " | (1) | 0.5 | " | " | ⊙ | ○+ | ⊙ | ⊙ | ⊙ | ⊙ | |
| 27 | " | Coating Type | " | " | " | " | " | " | " | " | " | 1.0 | " | " | ⊙ | ⊙ | ⊙ | ⊙ | ⊙ | ⊙ | |
| 28 | " | Coating Type | " | " | " | " | " | " | " | " | " | 10.0 | " | " | ⊙ | ⊙ | ⊙ | ⊙ | ⊙ | ⊙ | |
| 29 | " | Coating Type | " | " | " | " | " | " | " | " | " | 15.0 | " | " | ⊙ | ○+ | ⊙ | ⊙ | ⊙ | ⊙ | |
| 30 | " | Coating Type | " | " | " | " | " | " | " | " | (2) | 0.5 | " | " | ⊙ | ○+ | ⊙ | ⊙ | ⊙ | ⊙ | |
| 31 | " | Coating Type | " | " | " | " | " | " | " | " | " | 1.0 | " | " | ⊙ | ⊙ | ⊙ | ⊙ | ⊙ | ⊙ | |
| 32 | " | Coating Type | " | " | " | " | " | " | " | " | " | 10.0 | " | " | ⊙ | ⊙ | ⊙ | ⊙ | ⊙ | ⊙ | |

TABLE 8-continued

| No. | Steel sheet *1 | Chromate film Type | Chromate film B(mg/m²) | Resin film M *2 | Silica compound Type *3 | Silica compound N | O Type *4 | O P | M/Q *5 | Silica R *6 | Silane compound Type *7 | Silane compound T *8 | U(g/m²) | D (°C.) | Corrosion resistance V CCT | Corrosion resistance W CCT | Corrosion resistance X CCT | Multi-coating Y | Multi-coating G | Multi-coating H | Remark |
|---|---|---|---|---|---|---|---|---|---|---|---|---|---|---|---|---|---|---|---|---|---|
| | | ing Type | | | | | | | | | | | | | | | | | | | |
| 33 | " | Coat-ing Type | " | " | " | " | " | " | " | " | " | 15.0 | " | " | ⊚ | ○+ | ⊚ | ⊚ | ⊚ | ⊚ | |
| 34 | " | Coat-ing Type | 10 | " | " | " | " | " | " | " | — | — | " | " | ⊚ | ○ | ○+ | ⊚ | ⊚ | ⊚ | |
| 35 | " | Coat-ing Type | 30 | " | " | " | " | " | " | " | — | — | " | " | ⊚ | ○+ | ⊚ | ⊚ | ⊚ | ⊚ | |
| 36 | " | Coat-ing Type | 80 | " | " | " | " | " | " | " | — | — | " | " | ⊚ | ○+ | ⊚ | ⊚ | ⊚ | ⊚ | |
| 37 | " | Coat-ing Type | 200 | " | " | " | " | " | " | " | — | — | " | " | ⊚ | ○+ | ⊚ | ⊚ | ⊚ | ⊚ | Z |
| 38 | " | I | " | " | " | " | " | " | " | " | — | — | " | " | ⊚ | ○+ | ⊚ | ⊚ | ⊚ | ⊚ | " |
| 39 | " | Coat-ing Type | 50 | " | " | 92/8 | " | 3 | 90/10 | " | — | — | " | " | Δ | x | x | ⊚ | ⊚ | ⊚ | |
| 40 | " | Coat-ing Type | " | " | " | 47/53 | " | 38 | 40/60 | " | — | — | " | " | Δ | x | x | Δ | Δ | ⊚ | |
| 41 | " | Coat-ing Type | " | " | " | 61/39 | " | 2 | 60/40 | 39/1 | — | — | " | " | ⊚ | x | x | ⊚ | ⊚ | ⊚ | |
| 42 | " | Coat-ing Type | " | " | " | 86/14 | " | 50 | " | 10/30 | — | — | " | " | Δ | x | x | ⊚ | ⊚ | ⊚ | |
| 43 | " | Coat-ing Type | " | " | (5) | " | " | " | " | 30/10 | — | — | " | " | Δ | Δ | Δ | ⊚ | ⊚ | ⊚ | |
| 44 | B | Coat-ing Type | " | " | (3) | 67/33 | " | 17 | " | " | — | — | " | " | ⊚ | Δ | ○− | ⊚ | ⊚ | ⊚ | |
| 45 | C | Coat-ing Type | " | " | " | " | " | " | " | " | — | — | " | " | ⊚ | ○− | ○ | ⊚ | ⊚ | ⊚ | |
| 46 | D | Coat-ing Type | " | " | " | " | " | " | " | " | — | — | " | " | ⊚ | Δ | ○ | ⊚ | ⊚ | ⊚ | |
| 47 | E | Coat-ing Type | " | " | " | " | " | " | " | " | — | — | " | " | ⊚ | Δ | ○− | ⊚ | ⊚ | ⊚ | |
| 48 | F | Coat-ing Type | " | " | " | " | " | " | " | " | — | — | " | " | ⊚ | Δ | ○ | ⊚ | ⊚ | ⊚ | |

TABLE 8-continued

| | | | | Resin film | | | | | | | | | | | | | | | | | |
|---|---|---|---|---|---|---|---|---|---|---|---|---|---|---|---|---|---|---|---|---|---|
| | | Chromate film | | | Silica compound | | O | | | Silica | Silane compound | | | D | Corrosion resistance | | | | Multi-coating | | |
| No. | Steel sheet *1 | Type | B(mg/m²) | M *2 | Type *3 | N | Type *4 | P | M/Q *5 | R *6 | Type *7 | T *8 | U(g/m²) | (°C.) | V CCT | W CCT | X CCT | Y | G | H | Remark |
| 49 | G | Coating Type | " | " | " | " | " | " | " | " | — | — | " | " | ○ | ○– | ○ | ○ | ○ | ○ | |

Note
A through L: Same as those of Tables 1 to 3
M: Substrate resin;
N: Substrate resin/Silica (weight ratio)
O: Sparing water soluble Cr compound;
P: Proportion to substrate resin;
Q: Silica + Cr compound;
R: Cr compound;
T: Proportion;
U: Coating weight;
V: Flat sheel;
W: Post-working;
X: Sharply cut;
Y: Cr elusion;
CCT: Continuous corrosion test
Z: Slightly inferior weldability

TABLE 9

| No. | Steel sheet*1 | Chromate film Type | Chromate film B (mg/m²) | Resin film M*2 | Silica compound Type*3 | Silica compound N | O Type*4 | P | M/Q5 | Silica R*6 |
|---|---|---|---|---|---|---|---|---|---|---|
| Comparison Examples | | | | | | | | | | |
| 1 | A | Coating Type | 50 | (4) | (3) | 67/33 | (4) | 17 | 60/40 | 30/10 |
| 2 | " | Coating Type | " | " | " | " | " | " | " | " |
| 3 | " | Coating Type | " | " | " | " | " | " | " | " |
| 4 | " | Coating Type | " | " | " | " | (8) | " | " | " |
| 5 | " | Coating Type | " | (6) | " | " | (4) | " | " | " |
| 6 | " | Coating Type | " | " | " | " | " | " | " | " |
| 7 | " | Coating Type | " | (7) | " | " | " | " | " | " |
| 8 | " | Coating Type | " | " | " | " | " | " | " | " |
| 9 | " | Coating Type | 1 | (4) | " | " | " | " | " | " |
| 10 | " | Coating Type | 1000 | " | " | " | " | " | " | " |

| No. | Resin film: Silane compound Type*7 | Resin film: Silane compound T*8 | Resin film: U (g/m²) | Resin film: D (°C.) | Corrosion resistance VCCT | Corrosion resistance WCCT | Corrosion resistance XCCT | Y | Multi coating G | Multi coating H | Remark |
|---|---|---|---|---|---|---|---|---|---|---|---|
| Comparison Examples | | | | | | | | | | | |
| 1 | — | — | 1.0 | 200 | ◎ | ○+ | ○+ | ○ | ○ | ○ | BH |
| 2 | — | — | 0.1 | 150 | Δ | x | x | ○ | ○ | ○ | |
| 3 | — | — | 4.0 | " | ◎ | ○+ | ○+ | ○ | ○ | ○ | ZZ |
| 4 | — | — | 1.0 | " | Δ | x | x | x | Δ | x | |
| 5 | — | — | " | " | ○ | Δ | ○− | ◎ | ◎ | ◎ | |
| 6 | 1 | 5 | " | " | ○+ | ○− | ○ | ◎ | ◎ | ◎ | |
| 7 | — | — | " | " | ○ | Δ | ○− | ◎ | ◎ | ◎ | |
| 8 | 2 | 5 | " | " | ○+ | ○− | ○ | ◎ | ◎ | ◎ | |
| 9 | — | — | " | " | Δ | Δ | Δ | ◎ | ◎ | ◎ | |
| 10 | — | — | " | " | ◎ | + | ◎ | x | ◎ | ◎ | ZZZ |

Note
A through Y: Same as those of above mentioned Tables
BH: Inferior BH property;
ZZ: Poor weldability;
ZZZ: Inferior weldability
*1: See Table 10.
*2: See Table 4.
*3: See Table 5.
*4: See Table 6.
*5: Stands for the proportion in weight ratio of the sustrate resin and the (silica + sparingly water soluble Cr compound).
*6: Stands for the proportion in weight ratio of the silica and the sparingly water soluble Cr compound dispersed in the substrate resin.
*7: See Table 7.
*8: Indicates the weight parts of the di- or tri-alkoxysilane compound with respect to 100 weight parts of the (organic high-molecular resin + hydrophobic silica + sparingly water soluble Cr compound).
*9: Denotes the weight parts of sparingly water soluble Cr compound with respect to 100 weight parts of the substrate resin.

TABLE 10

| | |
|---|---|
| A | Electrodeposition of Zinc alloy (12% Ni—Zn, 20 g/m²) |
| B | Electrodeposition of Zinc alloy (20% Fe—Zn, 40 g/m²) |
| C | Electrogalvanization (40 g/m²) |
| D | Hot Zinc plating (90 g/m²) |
| E | Hot deposition of Zinc alloy (10% Fe—Zn, 45 g/m²) |
| F | Hot deposition of Zinc alloy (5.0% Al—0.5% Mo, 90 g/m²) |

TABLE 10-continued

| | |
|---|---|
| G | Electrodeposition of Zinc alloy (60% Mn—Zn, 20 g/m²) |

As understood from the foregoing examples, it is preferred to use $BaCrO_4$ and $SrCrO_4$ as sparingly water soluble Cr compound to be dispersed in the resin together with the silica and in view of corrosion resistance in particular.

In view of Cr elution, preference is given to $BaCrO_4$, $ZnCrO_4.Zn(OH)_2$ and $CaCrO_4$. In order to achieve the most excellent quality/performance combination (esp., corrosion resistance and Cr elution), therefore, the hydrophobic silica and $BaCrO_4$ may be dispersed in the substrate resin in the predetermined resin.

EFFECT OF THE INVENTION

According to the present invention, excellent corrosion resitance and high coating adhesion are achievable, while multicoated steel sheets can be made by low-temperature baking. It is thus possible to improve productivity and reduce the unit of energy. Application of the baking temperature of 150° C. or lower also makes it possible to produce highly corrosion-resistant, surface-treated steel sheets from the so-called BH type steel sheets having bake-hardening properties.

What is claimed is:

1. A highly corrosion-resistant, multi-layer coated steel sheet plated with zinc or a zinc alloy, which includes the following films A and B on its plated side in that order:

A: a chromate film, and

B: a résin-composition film composed of an organic highmolecular weight resin having a glass transition temperature of 343° to 423° K. and soluble in an organic solvent and hydrophobic silica in a proportion of 80:20 to 62:38 in weight (organic high-molecular weight resin: hydrophobic silica) ratio, and said films being deposited in a coating amount of 0.3 to 3.0 $g/m^2$.

2. A steel sheet as recited in claim 1, wherein said organic highmolecular weight resin is one of acrylic copolymer, alkyd and epoxy resins, or a mixture or addition condensation product of two or more thereof.

3. A highly corrosion-resistant, multi-layer coated steel sheet plated with zinc or a zinc alloy, which includes the following films A and B on its plated side in that order:

A: a chromate film, and

B: a resin-composition film composed of an organic high-molecular weight resin having a glass transition temperature of 343° to 423° K. and soluble in an organic solvent, hydrophobic silica in a proportion of 80:20 to 62:38 in weight (organic high-molecular weight resin:hydrophobic silica) ratio and sparingly water soluble Cr compound in a proportion of 1 to 30 weight parts per 100 weight parts of said organic high-molecular weight resin, and said films being deposited in a coating amount of 0.3 to 3.0 $g/m^2$.

4. A steel sheet as recited in claim 3, wherein the proportion in weight ratio of said organic high-molecular weight resin:said (hydrophobic silica+sparingly water soluble Cr compound) is between 80:20 and 56:44, and the proportion in weight ratio of said hydrophobic silica:said sparingly water soluble Cr compound is between 37:3 and 25:15.

5. A steel sheet as recited in claim 4, wherein the proportion in weight ratio of said organic high-molecular weight resin:said (hydrophobic silica+sparingly water soluble Cr compound) is between 70:30 and 56:44.

6. A steel sheet as recited in claim 4 or 5, wherein the proportion in weight ratio of said hydrophobic silica:said sparingly water soluble Cr compound is between 35:5 and 25:15.

7. A steel sheet as recited in any one of claims 3, 5, wherein said organic high-molecular weight resin is one of acrylic copolymer, alkyd and epoxy resins, or a mixture or addition condensation product of two or more thereof.

8. A steel sheet as recited in any one of claims 3, 5, wherein said sparingly water soluble Cr compound comprises one or more of barium chromate ($BaCrO_4$), strontium chromate ($SrCrO_4$), lead chromate ($PbCrO_4$), zinc chromate ($ZrCrO_4.4Zn(OH)_2$), calcium chromate ($CaCrO_4$), potassium chromate ($K_2O.4ZnO.4CrO_3.3H_2O$) and silver chromate ($AgCrO_4$).

9. A steel sheet as recited in claim 8, wherein said sparingly water soluble Cr compound comprises barium chromate ($BaCrO_4$) and/or strontium chromate ($SrCrO_4$).

10. A highly corrosion-resistant, multi-layer coated steel sheet plated with zinc or a zinc alloy, which includes the following films A and B on its plated side in that order:

A: a chromate film, and

B: a resin-composition film composed of an organic high-molecular weight resin having a glass transition temperature of 343° to 423° K. and soluble in an organic solvent, hydrophobic silica in a proportion of 80:20 to 62:38 in weight (organic high-molecular resin: hydrophobic silica) ratio, sparingly water soluble Cr compound in a proportion of 1 to 30 weight parts per 100 weight parts of said organic high-molecular resin and a di- or tri-alkoxysilane compound in a proportion of 0.5 to 15 weight parts per 100 weight parts of said (organic high-molecular weight resin+hydrophobic silica+sparingly water soluble Cr compound), and said films being deposited in a coating amount of 0.3 to 3.0 $g/m^2$.

11. A steel sheet as recited in claim 10, wherein the proportion in weight ratio of said organic high-molecular weight resin:said (hydrophobic silica+sparingly water soluble Cr compound) is between 80:20 and 56:44, and the proportion in weight ratio of said hydrophobic silica:said sparingly water soluble Cr compound is between 37:3 and 25:15.

12. A steel sheet as recited in claim 10, wherein the proportion in weight ratio of said organic high-molecular weight resin:said (hydrophobic silica+sparingly water soluble Cr compound) is between 70:30 and 56:44.

13. A steel sheet as recited in claim 11 or 12, wherein the proportion in weight ratio of said hydrophobic silica:said sparingly water soluble Cr compound is between 35:5 and 25:15.

14. A steel sheet as recited in any one of claims 10 to 12, wherein said organic high-molecular weight resin is one of acrylic copolymer, alkyd and epoxy resins, or a mixture or addition condensation product of two or more thereof.

15. A steel sheet as recited in any one of claims 10 to 12, wherein said sparingly water soluble Cr compound comprises one or more of barium chromate ($BaCrO_4$), strontium chromate ($SrCrO_4$), lead chromate ($PbCrO_4$), zinc chromate ($ZrCrO_4.4Zn(OH)_2$), calcium chromate ($CaCrO_4$), potassium chromate ($K_2O.4ZnO.4CrO_3.3H_2O$) and silver chromate ($AgCrO_4$).

16. A steel sheet as recited in claim 15, wherein as said sparingly water soluble Cr compound comprises barium chromate ($BaCrO_4$) and/or strontium chromate ($SrCrO_4$).

* * * * *